(12) United States Patent
Ishizaki et al.

(10) Patent No.: US 8,649,020 B2
(45) Date of Patent: Feb. 11, 2014

(54) COLOR CHART

(75) Inventors: Hiroyoshi Ishizaki, Kanagawa (JP);
Tadashi Kitai, Kanagawa (JP); Hitomi Kaneko, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 62 days.

(21) Appl. No.: 13/332,811

(22) Filed: Dec. 21, 2011

(65) Prior Publication Data
US 2012/0162649 A1 Jun. 28, 2012

(30) Foreign Application Priority Data

Dec. 24, 2010 (JP) ................................. 2010-287094
May 20, 2011 (JP) ................................. 2011-113569

(51) Int. Cl.
*G01B 9/02* (2006.01)
*B41J 2/03* (2006.01)

(52) U.S. Cl.
USPC ............... 356/495; 382/164; 347/24; 347/43; 347/74

(58) Field of Classification Search
None
See application file for complete search history.

(56) References Cited

U.S. PATENT DOCUMENTS

| | | | | |
|---|---|---|---|---|
| 4,719,506 | A * | 1/1988 | Van Buren | 358/506 |
| 7,103,216 | B2 * | 9/2006 | Okamoto | 382/167 |
| 7,233,398 | B2 * | 6/2007 | Kitazawa | 356/402 |
| 2002/0051002 | A1 * | 5/2002 | Kumada et al. | 345/600 |
| 2009/0310153 | A1 * | 12/2009 | Ito et al. | 358/1.9 |
| 2011/0063618 | A1 * | 3/2011 | Horita | 356/402 |

FOREIGN PATENT DOCUMENTS

| | | |
|---|---|---|
| EP | 1 187 464 A2 | 3/2002 |
| JP | 10-322555 | 12/1998 |
| JP | 2001-88357 | 4/2001 |
| JP | 2002-142126 | 5/2002 |
| JP | 2003-111108 | 4/2003 |
| JP | 2003-289446 | 10/2003 |
| JP | 2005-229371 | 8/2005 |
| JP | 2005-269470 | 9/2005 |
| JP | 2009-192463 | 8/2009 |

OTHER PUBLICATIONS

The Extended European Search Report issued Apr. 3, 2012, in Application No. / Patent No. 11195399.8-2202.
Mark H. McCormick-Goodhart, "An Introduction to the I* Metric", Article #: Aal_2007_0207_TA-01 Rev:, Source: Aardenburg Imaging & Archives, XP-002672048, Retrieved from the Internet: URL:http://www.aardenburg-imaging.com/cgi-bin/mrk/4605ZGxkLzBeMTAwMDAwMDAwMTIzNDU2Nzg5LyoxMQ, Jul. 24, 2007, 17 pages.
HutchColor LLC:, "HCT User Guide", (Precision Scanner Target), Version 37, XP-002672049, Retrived from the Internet: URL:http://www.hutchcolor.com/PDF/User_Guide.pdf, Nov. 2008, 38 pages.

* cited by examiner

*Primary Examiner* — Gregory J Toatley
*Assistant Examiner* — Maurice Smith
(74) *Attorney, Agent, or Firm* — Oblon, Spivak, McClelland, Maier & Neustadt, L.L.P.

(57) ABSTRACT

A color chart having a plurality of mirror-image color blocks arranged in a matrix, with each color block a mirror image of an adjacent color block, each color block having rows and columns of color patches, wherein the concentration of a first color of the multiple colors changes unidirectionally across color patches in any given row of a color block, the concentration of a second color of the multiple colors changes unidirectionally across color patches in any given column of a color block, and the concentration of a third color of the multiple colors remains unchanged across all the plurality of color patches within a color block and differs only between color blocks.

7 Claims, 7 Drawing Sheets

COLOR CHART

CROSS-REFERENCE TO RELATED APPLICATIONS

This patent application is based on and claims priority pursuant to 35 U.S.C. §119 to Japanese Patent Application Nos. 2010-287094 and 2011-113569, filed on Dec. 24, 2010 and May 20, 2011, respectively in the Japanese Patent Office, the entire disclosure of which is hereby incorporated herein by reference.

FIELD OF THE INVENTION

The present invention relates to a color chart.

BACKGROUND OF THE INVENTION

In recent years, image forming apparatuses employing electrophotography and an ink jet recording system have come to be used in the field of on-demand printing. Yet even users in the field of the quick printing (on-demand printing) demand high quality production from such image forming apparatuses. To meet that demand, manufacturers adjust product quality, in particular color reproduction concentration, at shipment.

In addition, image quality is also affected by the course of time, environmental changes, changes in characteristics of developing agents, etc., due to usage conditions thereof, and usage of paper having different characteristics. Consequently, users also must adjust color reproduction concentration to maintain the quality of images for such changes over time, environmental changes, and characteristic changes.

Image forming apparatuses employing electrophotography convert image data formed of the colors red (R), green (G), and blue (B) image data or cyan (C), magenta (M), yellow (Y), and black (K) into reproducible colors according to color reproduction models in the apparatuses. Images are formed on recording media using image forming materials such as toner and ink constituted of, for example, the colors yellow, magenta, cyan, and black. The color conversion described above is conducted by using color conversion profiles stored in the image forming apparatuses. The color conversion profiles are made based on a color reproduction model at the stages of designing, manufacturing, and shipment. That color reproduction model indicates the range of colors reproducible by an image forming apparatus and is expressed as a characteristic diagram of three axes of X, Y, and Z, mapping intensity, saturation, and color phase, respectively. A simpler color reproduction model can be provided in which colors are expressed using saturation for the X axis and intensity for the Y axis.

A color chart is another color reproduction model in which color patches representing colors reproducible by an image forming apparatus are arranged. The color chart is output by an image forming apparatus and measured by a colorimeter to make the color conversion profile described above.

Naturally, the range of reproducible colors of an image forming apparatus subjected to color reproduction concentration adjustment depends on the color chart serving as the color reproduction model.

The reproduction colors of the color patches forming the color chart are expressed as predetermined pile heights. The pile height is the total of the physical amount of an image forming material formed of, for example, yellow, cyan, magenta, and black in proportion to the color reproduction concentration of the four colors.

Therefore, the reproducible colors of the color patch are expressed as the total of the physical amount in proportion to the color reproduction concentration of the four colors.

FIG. 5 is a diagram illustrating one of multiple color blocks forming a typically used color chart. A color block 10 illustrated in FIG. 5(*a*) includes color patches 11 arranged in a matrix (of 12×12 patches in this example) which have different color reproduction concentrations formed by increasing the color reproduction concentrations of cyan (C) and magenta (M) (from among cyan (C), magenta (M), yellow (Y), and black (K)) at a fixed rate.

In FIG. 5(*a*), the ratio of the color reproduction concentration of each of yellow (Y) and black (K) is 0%.

While the color reproduction concentration of one of the two colors selected from the four colors is kept constant, color patches are formed by increasing the color reproduction concentration of the other color of the selected two at a fixed rate and arranged vertically or the row direction.

For example, the color block 10 illustrated in FIG. 5A is constituted according to the following layout procedure of multiple color patches 11. A color patch column group 12 is formed by sequentially laying out multiple color patches 11 formed by increasing the color reproduction concentration of magenta (M) vertically at a fixed rate while the color reproduction concentration of cyan (C) is kept unchanged at a predetermined ratio.

The color patch column group 12 is copied horizontally while increasing the color reproduction concentration of cyan (C) at a predetermined fixed rate. This is repeated while increasing the level of the predetermined fixed rate one by one until the thus-formed multiple copied color patch column groups with different levels of color reproduction concentration are laid out horizontally (from left to right in FIG. 5(*a*)) according to the color reproduction concentration to obtain the color block 10.

A color patch row group 13 is formed by sequentially laying out multiple color patches 11 formed by increasing the color reproduction concentration of cyan (C) level by level at a fixed rate while the color reproduction concentration of cyan (M) is kept at a predetermined color reproduction concentration unchanged. The color patch row group 13 is copied vertically while increasing the color reproduction concentration of cyan (M) one level of a predetermined fixed rate. This is repeated while increasing the level of the predetermined fixed rate one by one until the thus-formed multiple copied color patch row groups with different levels of the fixed rate of color reproduction concentration are laid out vertically (from top to bottom in FIG. 5(*a*)) according to the color reproduction concentration to obtain the color block 10.

To the color block 10 of FIG. 5(*a*), in which the ratio of the color reproduction concentration of yellow (Y) and black (K) to the total of the color reproduction concentration of the four colors is zero, the ratio of the color reproduction concentration of yellow (Y) is raised one level of a predetermined fixed rate for all the color patches 11 in the color block 10 to obtain a color block 20 illustrated in FIG. 5(*b*). The ratio of color reproduction concentration of black (K) to the color reproduction concentration of the colors is still kept at 0%. Then, other color blocks having different color reproduction concentrations of yellow (Y) are repeatedly formed as described above until all the color blocks laid out as in FIG. 6 (four color blocks 10, 20, 30, and 40 in FIG. 6). Thereafter, the color blocks 10, 20, 30, and 40 illustrated in FIG. 6 are output on the surface of recording paper serving as an output medium to form a color chart 50. To be specific, the color block 20 is laid out adjacent to the color block 10 horizontally.

The color block 30 is laid out not adjacent to the color block 20 horizontally but to the color block 10 vertically if it cannot be output on the surface of the recording paper because of the size of the surface as illustrated in FIG. 6. Furthermore, the color block 40 is laid out adjacent to the color block 30 horizontally. As a result, it can be seen that, in the color chart 50 having such an arrangement, for example, the concentration difference between a color patch 51-1 and a color patch 51-2 laid out adjacent to the color patch 51-1 horizontally is extremely large, as illustrated in FIG. 6. The implications of this large difference are explained below.

Next, the color reproduction concentration in the image forming apparatus using the color chart 50 output must be adjusted. First, a color patch, for example, the color patch 51-1 in the reading spot indicated by broken lines in FIG. 6, is read by a colorimeter, which is a device that irradiates a reading target with light and receives only reflected light therefrom to output image data. Then, a higher-level device temporarily stores the read image data and compares them with reference data of the color patch present corresponding to the arrangement in the color chart preliminarily stored in a memory table. The color reproduction concentration in the target image forming apparatus is adjusted based on this comparison result.

However, as described above, when image data expressed as RGB color space is color-converted into and expressed as YMCK on the output side, the combination of RGB is 256× 256×256, which is about 16,700,000 if one color has 256 gradations. Such a large combination of colors requires a number of sheets to obtain a printed color chart shown in FIG. 6.

In such a case, reading each of color patches by a colorimeter while focusing beams of light thereon takes an extremely long time to complete reading. To make the color reading time short, it is conceivable to reduce the number of the gradations and combinations. However, the color reproduction concentration distribution of each arranged color patch is rough, which results in a large adjustment error of the color reproduction concentration. Therefore, drastically reducing the number of gradations and combinations is not desirable.

In an attempt to shorten the time taken for color measuring, Japanese patent application publication no. 2001-088357 (JP-2001-088357-A) describes a method of reading multiple color patches of a color chart in a two-dimensional range. However, in the method of JP-2001-088357-A described above, to obtain the color patch in the color chart in the two-dimensional range, the image data of the color patch serving as the measuring target are affected by adjacent color patches. To be specific, as illustrated in FIG. 8(a), among YMCK of a target color patch 70 in part of the color chart, if the color reproduction concentration of, for example, cyan (C) of the target color patch 70 is much lower than those of the color patches 71 to 74 laid out adjacent to the target color patch 70, those color patches are read by a two-dimension scanning-type image pickup. In addition, as illustrated in FIG. 8(b), even when the color reproduction concentrations of cyan (C) of the color patches 71 to 74 are zero, those color patches are read by the two-dimension scanning-type image pickup.

These drawbacks stem from the scanning method of a scanner in which the reflected light of the color patches and paper around a target color patch is read as well as the reflected light from the target color patch irradiated with light in the two-dimensional range. Therefore, as illustrated in FIG. 8(c), by making the color reproduction concentration of, for example, cyan (C) among YMCK of the target color patch 70 same as those of the color patches 71 to 74 around the target color patch 70, the concentration components in the measuring data are the same or significantly close to each other if the reflected light from the color patches 71 to 74 in the two-dimensional range is taken in. Therefore, the image data of the target color patch 70 are much less affected.

However, the area of the same color significantly increases by laying out color patches having the same color around the target color patch, which in turn greatly decreases the number of target color patches in the color chart output on paper.

SUMMARY OF THE INVENTION

In view of the foregoing, the present invention provides an improved color chart having a plurality of mirror-image color blocks arranged in a matrix, with each color block a mirror image of an adjacent color block, each color block having rows and columns of color patches, wherein the concentration of a first color of the multiple colors changes unidirectionally across color patches in any given row of each color block, the concentration of a second color of the multiple colors changes unidirectionally across color patches in any given column of a color block, and the concentration of a third color of the multiple colors remains unchanged across all the plurality of mirror-image color patches within a color block and differs only between color blocks.

It is preferred that, in the color chart mentioned above, the concentration of the first color of the rows of color patches changes in discrete levels at a fixed rate.

It is still further preferred that, in the color chart mentioned above, the concentration of the second color of the columns of color patches changes in discrete levels at a fixed rate.

It is still further preferred that, in the color chart mentioned above, the concentration of the third color of differs between adjacent color blocks in discrete levels at a fixed rate As another aspect of the present invention, a group of color charts is provided which includes a plurality of the color charts mentioned above, wherein the concentration of a fourth color of the multiple colors differs between color charts.

It is preferred that, in the group of color charts mentioned above, the concentration of the fourth color among the plurality of the color charts changes in discrete levels at a fixed rate.

As another aspect of the present invention, an image forming apparatus that generates the color chart mentioned above for use in color reproduction concentration adjustment is provided which includes a memory unit that saves image data of a first color block and a processor that reverses the first color block to form a second mirror image of the first color block to form the color chart.

DETAILED DESCRIPTION OF THE INVENTION

When measuring a target color patch affected by color patches therearound, which includes the color patches having a color and brightness greatly different from those of the target color patch, the measuring values of the target color patch significantly vary. Therefore, if color patches having a color close to that of a target color patch are arranged therearound, the error of the measuring results can be reduced. The sequence of forming a color chart in which such color patches are laid out is described below.

Figure 1:
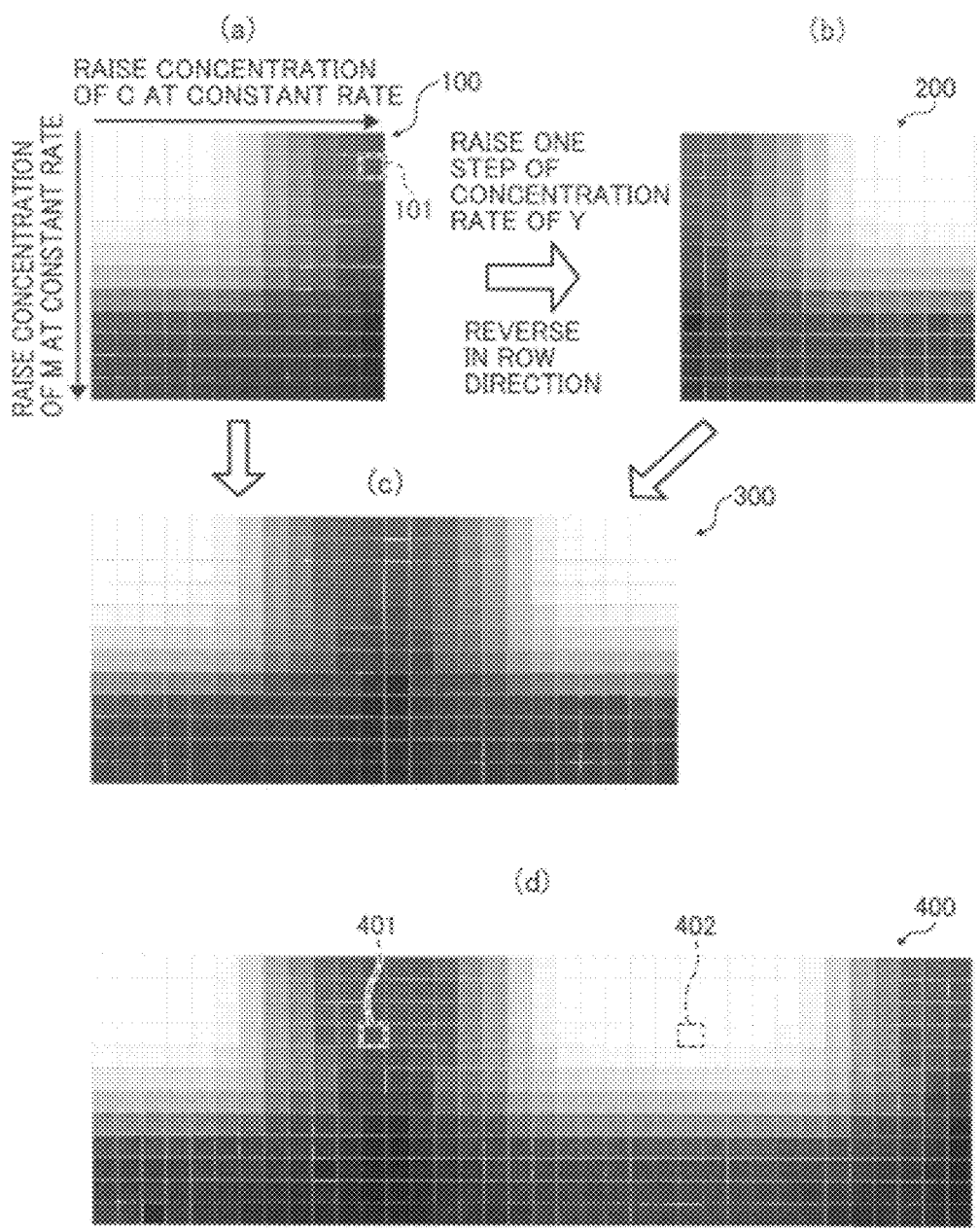
FIGS. 1(a), 1(b), 1(c), and 1(d) are diagrams illustrating a sequence of laying out color patches and color blocks in a color chart of an embodiment of the present disclosure.

FIG. 1 is a diagram illustrating the sequence of laying out color patches in a color chart of an embodiment of the present disclosure. The laying-out sequence of the color patches is described with reference to FIG. 1. First, select two changing colors (first color and second color) from the four colors of yellow (Y), magenta (M), cyan (C), and black (K). In this case, cyan (C) and magenta (M) are selected as the changing colors. As illustrated in FIG. 1(a), color patches 101 each of which has a different combination of cyan (C) and magenta (M) made by preferably changing the level (12 levels in this case) at a fixed rate for each two colors (first color and second color) are laid out two-dimensionally (i.e., matrix) to form a color block 100. Next, a color block chart 200 illustrated in FIG. 1B is made by copying the color block 100 illustrated in FIG. 1(a) and raising the ratio of the color reproduction concentration of yellow (Y) preferably one level of the fixed rate followed by reversing related to a direction, for example, the row direction or the column direction. In this embodiment, the direction is the row direction. A color chart 300 of FIG. 1(c) is synthesized by connecting the color block 100 of FIG. 1(a) with the color block 200 of FIG. 1(b) along the row direction. To be specific, the image data of the color block 100 is saved in a memory and reversed by the mirror reversing processing on the memory to obtain the image data for the color block 200 followed by increasing the color reproduction concentration of yellow (Y) (third color). Thereafter, the image data of the color block 100 and the image data of the color block 200 are synthesized on the memory to obtain the image data of the color chart 300. Furthermore, a color chart 400 illustrated in FIG. 1(d) is made by copying the color chart 300 of FIG. 1(c) and the color block 100 of FIG. 1(a), raising the ratio of the color reproduction concentration of yellow (Y) of the color block 100 two levels of the fixed rate, and synthesizing the color chart 300 with the resultant color block.

Alternatively, color patches of respective color reproduction concentrations are separately made and laid out to form the color chart 300 illustrated in FIG. 1(b) and the color chart 400 of FIG. 1(d).

In the color chart 400, for example, target color patches 401 and 402 illustrated in FIG. 1(d) are taken as examples for description. Around the color patches 401 and 402 are arranged color patches having slightly different color reproduction concentrations from those of the color patches 401 and 402. Therefore, when the color chart 400 is read by an image pickup device such as a scanner that can read in the two-dimensional range, the measuring results of the target color patches 401 and the 402 have just small errors.

It is possible to conduct a reversing process according to the layout of target color patches and not necessary to conduct reversing all as illustrated in FIG. 1.

Figure 2:
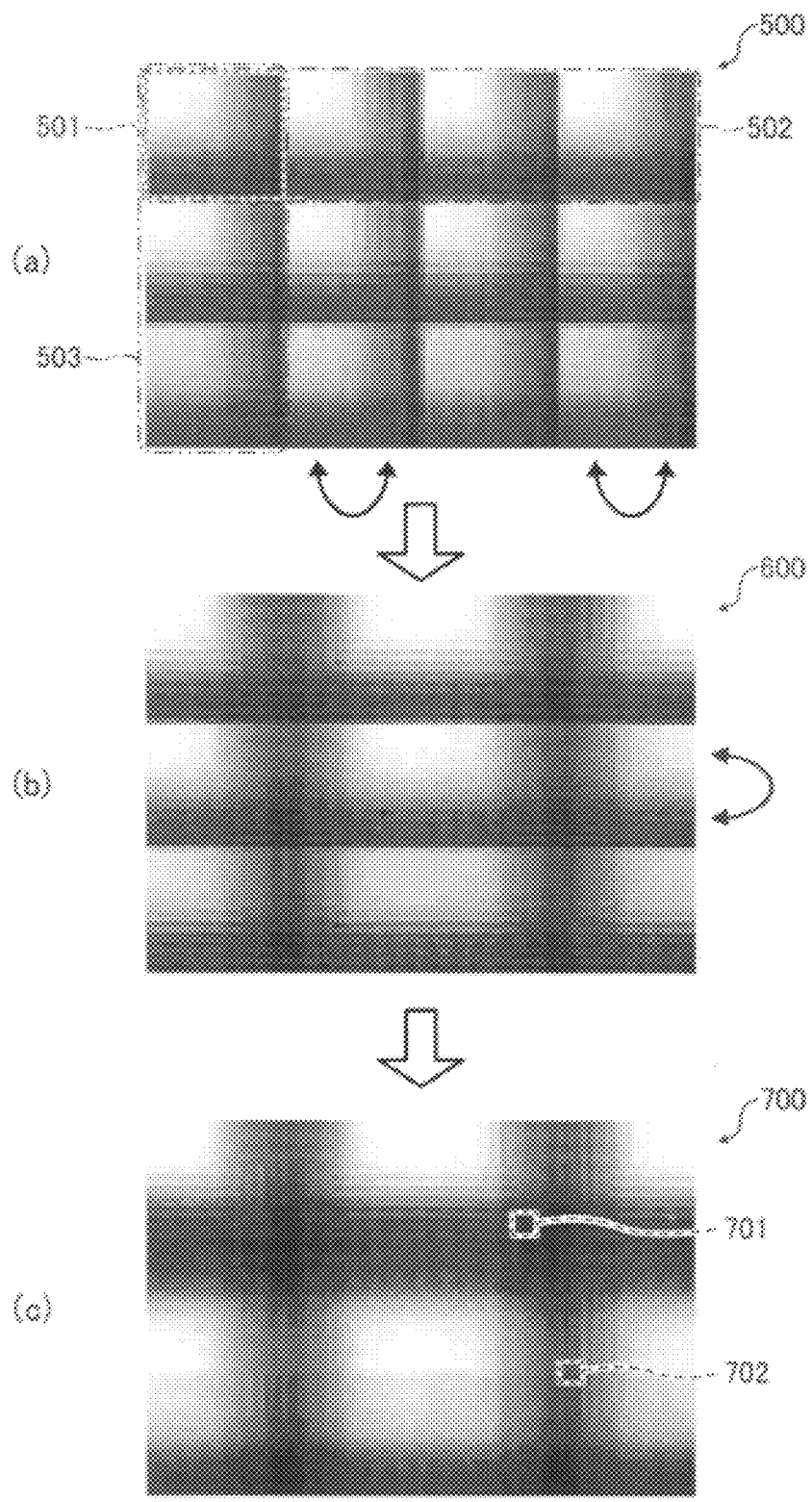
FIGS. 2(a), 2(b), and 2(c) are diagrams illustrating another sequence of laying out color patches and color blocks in a color chart of an embodiment of the present disclosure.

FIG. 2 is a diagram illustrating another sequence of forming a color chart of the embodiment. In FIG. 1, a desired color chart is formed by reversing and copying a single color chart. The sequence of forming a color chart illustrated in FIG. 2 is to conduct the following to a group of color blocks arranged vertically and the row direction in which multiple color patches are laid out in matrix to obtain a desired color chart. As illustrated in FIG. 2(a), to a color block 501 (enclosed by dotted lines in FIG. 2(a)) in which color patches of different combinations of cyan (c) and magenta (m) formed by changing the color reproduction concentrations of the two colors preferably level by level of respective fixed rates are laid out in matrix, The ratio of the color reproduction concentration of yellow (Y) is raised preferably in discreet levels at a fixed rate to form other color blocks and the resultant color blocks are laid out horizontally (a color block row group 502) and the column direction to form (color block column group 503).

That is, the color block group 500 illustrated in FIG. 2(a) are formed by laying out 12 color blocks by 3 rows times 4 columns.

Then, the even columns of the color block group 500 relative to the vertical direction, the second and the fourth columns of the color block group 500 in FIG. 2(a) are reversed to obtain a color block group 600 as illustrated in FIG. 2(b). Furthermore, the even row of the color block 600, i.e., the second row of the color block row group, is reversed vertically, a desired chart of a color chart 700 illustrated in FIG. 2(c) is formed. The process of laying out each color patch to form a specific color chart is conducted on the memory as described above.

In the color chart 700, for example, target color patches 701 and 702 illustrated in FIG. 2(c) are taken as examples for description. Around the color patches 701 and 702 are arranged color patches having slightly different color reproduction concentrations from those of the color patches 701 and 702. Therefore, when the color chart 700 is read by an image pickup device such as a scanner that can read in the two-dimensional range, the measuring results of the target color patches 701 and the 702 have only small errors.

It is possible to conduct a reversing process according to the layout of target color patches and not necessary to conduct reversing all as illustrated in FIG. 2.

Figure 3:
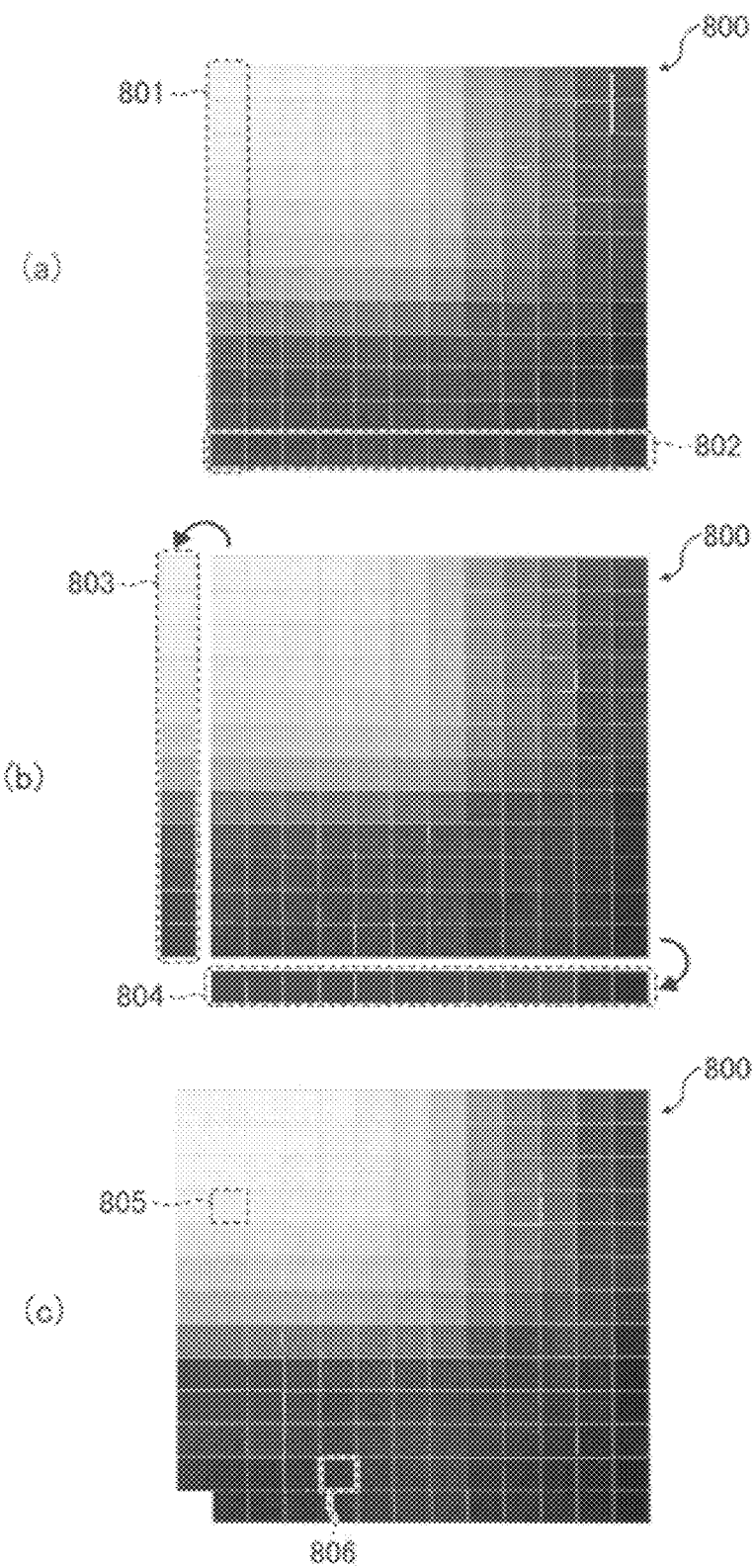
FIGS. 3(a), 3(b), and 3(c) are diagrams illustrating color blocks in which a copy of a color patch row group or a color patch column group at the outermost peripheral is added to the outermost peripheral.

When the color patches situated at the outermost periphery of the color charts formed by the sequence of laying out color patches described above are read by, for example, a two-dimensional scanner, the thus-obtained image data are affected by the basic color (typically white) of paper on which the color chart is output. As illustrated in FIG. 3, at least one copy of the color patch is laid out on the outside of the color patch situated at the outermost periphery. Depending on the reading performance of the scanner, for example, when a high-performance scanner is used and the measuring values of the color patch situated at the outermost periphery is affected by the basic color of paper, two or more copied color patches can be laid out to the outside. Therefore, all the color patches including the one situated at the outermost periphery are surrounded by color patches having the same color or close color. To be specific, as illustrated in FIG. 3(b), a color patch column group 801 and a color patch row group 802 which are part of the outermost periphery of a color chart 800 are copied. Then, as illustrated in FIG. 3B, the copied color patch column group 803 is laid out such that t the copied color patch column group 803 is tangent to the color patch column group 801. In addition, the copied color patch row group 804 is laid out such that t the copied color patch row group 804 is tangent to the color patch row group 802. Outermost processing is conducted on the memory as described above. As illustrated in FIG. 3(c), by copying the color patch column group and the color patch row group at the outermost peripheral, for example, in the case of the target color patch 805 in the color patch column group at the outermost peripheral and the target color patch 806 in the color patch row group 802 at the outermost peripheral, color patches having the same colors as the color patches 805 and 806 are laid on the outermost peripheral thereof.

Therefore, the basic color of the paper does not affect color measuring. The error of the measuring value is small when the color patches having such an arrangement at the outermost peripheral in the color chart are read by an image pickup device able to read in the two dimensional range such as a scanner.

Variation

Next, as a variation of the embodiment described above, a color chart group having multiple color charts is described which is formed by changing the ratio of the color reproduction concentration of an arbitrarily selected color (fourth color) from the multiple reproduction colors and further changing the ratio of the color reproduction concentration of the arbitrarily selected color from the multiple reproduction colors for each sheet.

Figure 4:
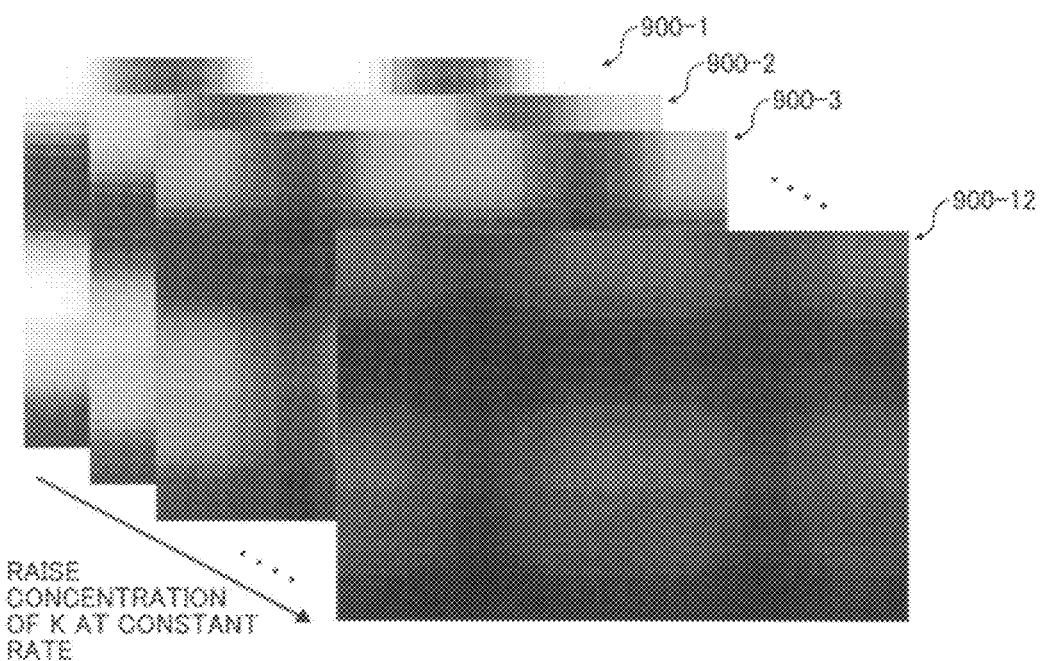
FIG. 4 is a diagram illustrating a group of color charts with different color reproduction concentration ratio of black (K)
Figure 5:
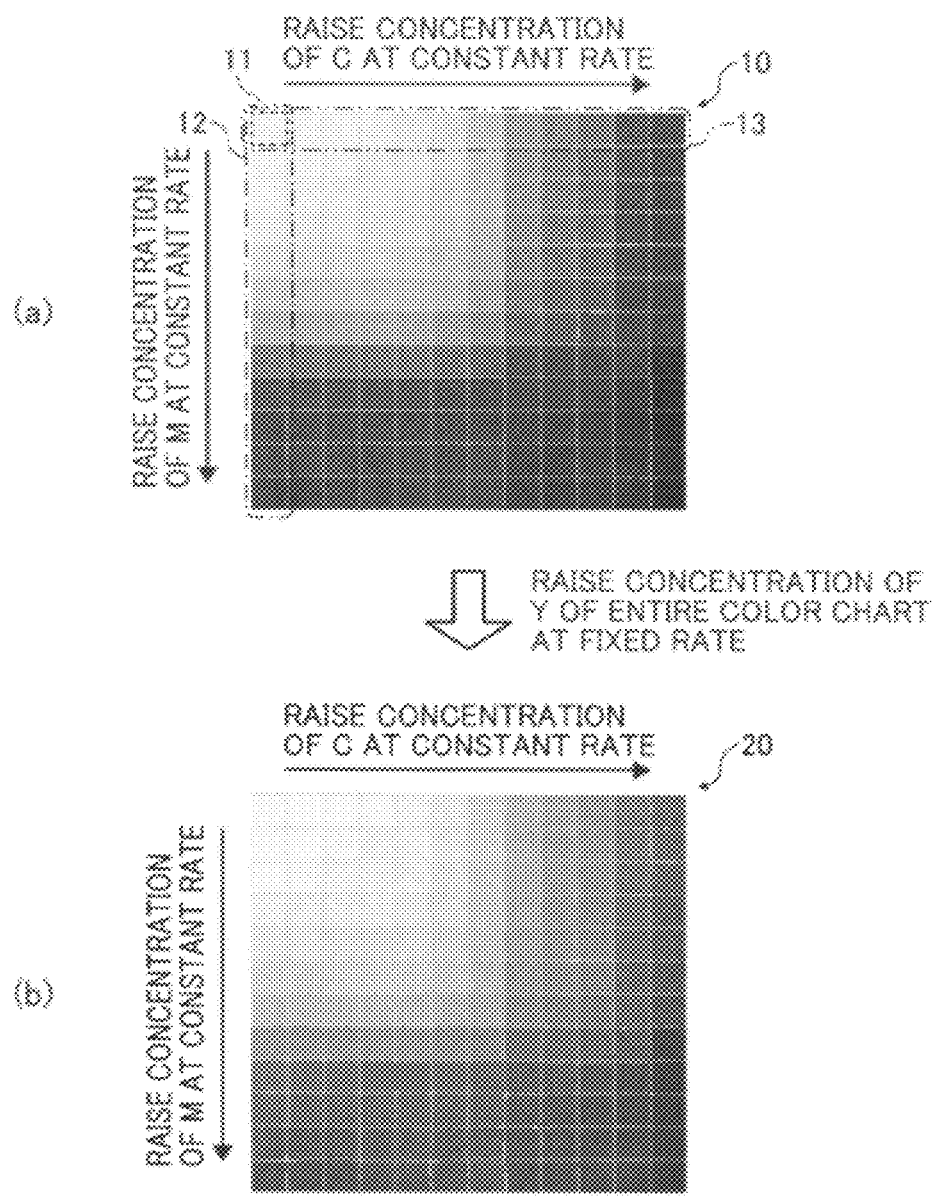
FIGS. 5(a) and 5(b) are diagrams illustrating color blocks in background art.
Figure 6:
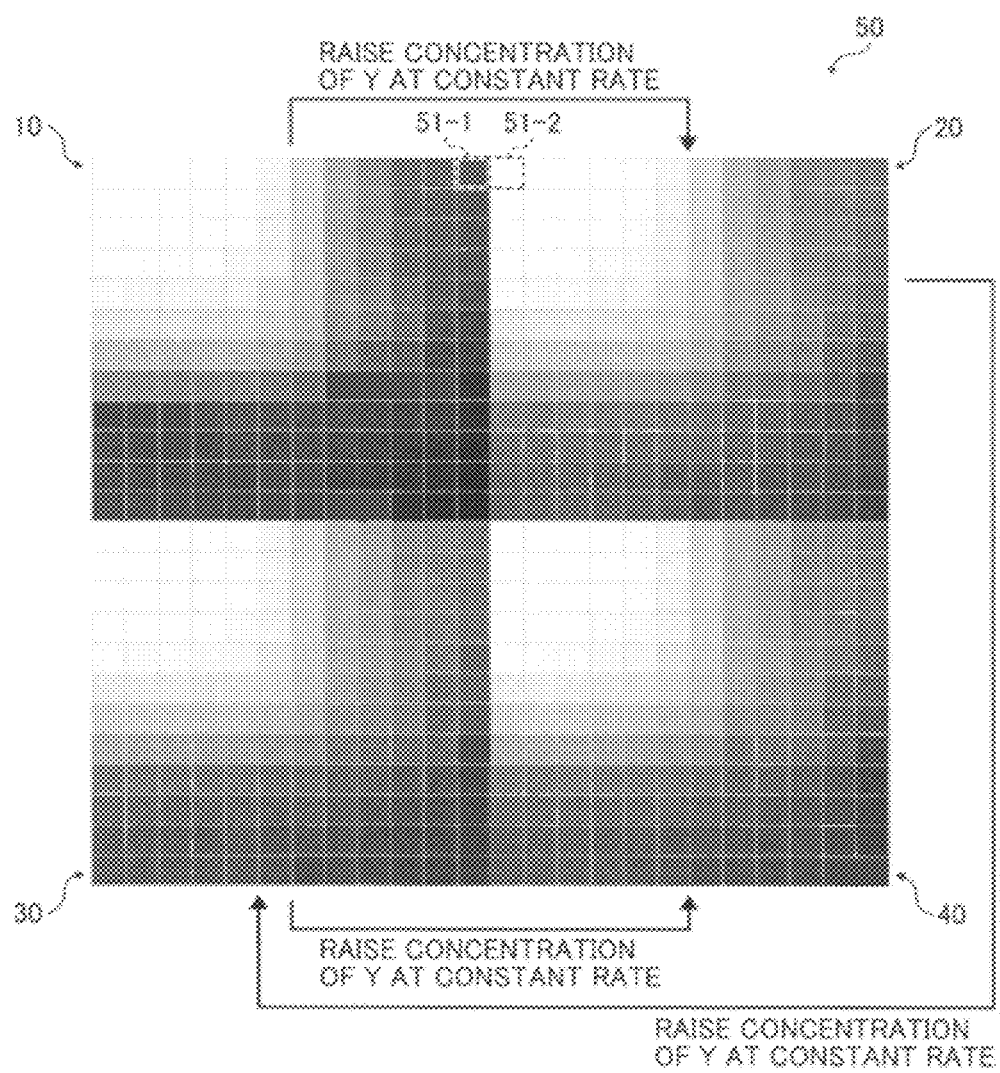
FIG. 6 is a diagram illustrating a color chart containing multiple color blocks in background art.
Figure 7:
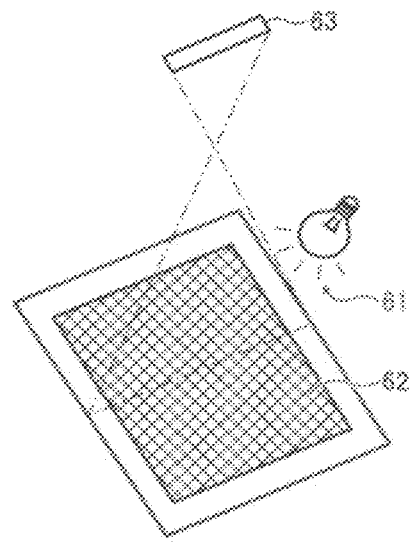
FIG. 7 is a schematic perspective view illustrating how to read color patches on a color chart by an image pickup device for reading a wide area.
Figure 8:
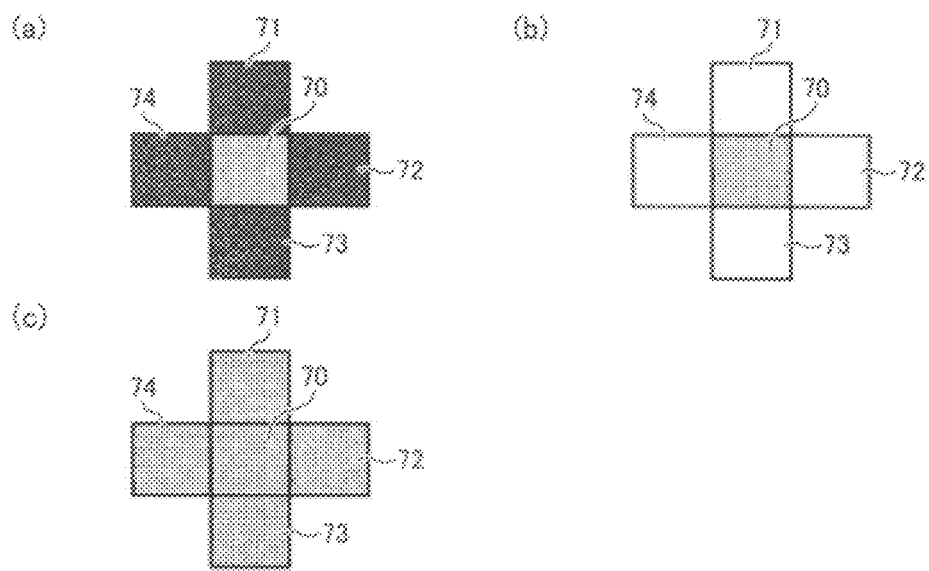
FIGS. 8(a), 8(b), and 8(c) are diagrams illustrating an impact of color patches arranged around a target color patch on measuring results.

First, the reproduction colors in which the ratio of the color reproduction concentration are changed within each color chart (i.e., first, second, and third colors) of the group of color charts and among the color charts (fourth color) are preliminarily determined. In this embodiment, the colors of the color reproduction concentration which are changed within the color chart are yellow (Y), magenta (M), and cyan (C) among YMCK and the color of the color reproduction concentration which is changed among the group of color charts is black (K). The color chart formed by changing the ratio of the color reproduction concentration for each color of YMC preferably with one degree of a predetermined value is shown in FIG. 2. The color chart is formed as described above. That is, color blocks are formed first in which the color patches are arranged in matrix according to the ratios of the color reproduction concentration of cyan (C) and magenta (M) changed by preferably level by level of a predetermined fixed rate. Then, based on the thus-formed color block, multiple color blocks are formed by changing the color reproduction concentration of the ratio of yellow (Y) level by level of a predetermined fixed rate. In this case, 12 color blocks are made. The color block group in which 12 color blocks are arranged is set in a single sheet to form a color chart. In the color chart, each color patch is laid out as described above such that the distribution of the color reproduction concentration for the entire layout is gentle. Next, since the key color (fourth color) of black (K) affects all the measured RGB components, the black (K) component must be the same in the color chart. That is, the ratio of the color reproduction concentration of black (K) is changed preferably with level by level at a fixed rate among the color charts. With regard to the combination of the three rest colors, the RGB components measured by the combination of the two colors change while keeping the remaining color the same to have the same influence. For example, a color block is formed by changing cyan (C) and magenta (M) one degree by one degree of the 12 degrees and yellow (Y) of the color block is changing one degree by one degree of 12 degrees to obtain a color block group having 12 color blocks. Then, the ratio of the black (K) is raised one degree by one degree of 12 degrees. That is, as illustrated in FIG. 4, the ratio of the color reproduction concentration of black (K) for the color block group in each color chart is changed one degree by one degree of the predetermined value to the 12th degree to obtain a color chart group having 12 color charts of 900-1 to 900-12.

Thereby, as in the case of the ink plate affected like the RGB component of a scanner such as reproduction color of transparent ink or gray ink, the concentration of the corresponding ink is printed by changing color charts as in the black plate.

As described above, according to the embodiments, as illustrated in FIG. 1, color patches having different color reproduction concentration are formed by changing the color reproduction concentration of selected colors, for example, cyan (C) and magenta (M) among the four colors one degree by one degree of a predetermined ratio to, for example, 12th degree and each color patch is laid out in matrix to form the color block 100. Then, the color block 100 is copied and the ratio of the color reproduction concentration of yellow (Y) of the copied color block is changed one degree of the predetermined value. Furthermore, the color block is reversed horizontally to form the color block 200.

Thereafter, the color block 200 is connected to the color block 100 horizontally to synthesize the color chart 300. In the thus-arranged color chart 300, color patches having a color reproduction concentration of cyan (C) and magenta (M) close to each other are laid out in the vicinity.

When the thus-obtained color chart is read by an image pickup device able to read a two dimensional range such as a scanner, the error of the measuring result of the color concentration is small.

In addition, the color reproduction concentrations of all of the color patches forming such a color chart are different from each other, thereby not reducing the number of the target color patches that can be output on paper.

In addition, according to the embodiments, as illustrated in FIG. 2, multiple color patches having a different color reproduction concentration of the first and the second colors from each other are formed and laid out in matrix to obtain a color block. Such color blocks having different color reproduction with regard to the third color are arranged to form the color chart 500 temporarily.

The even columns of the color block are reversed relative to the row direction and the even rows of the color block row groups 502 are reversed relative to the column direction to form the color chart 700. In the thus-arranged color chart 700, color patches having a color reproduction concentration close to each other with regard to the two colors among the four colors are laid out.

When the thus-arranged color chart is read by an image pickup device able to read in the two dimensional range such as a scanner, the error of the measuring result of the color concentration is small.

In addition, the color reproduction concentrations of all the color patches forming the color chart are different from each other. Therefore, the color patches output on paper are subjected to measuring and do not include the one laid out only to reduce an error as in typical techniques. Therefore, the number of the target color patches that can be output on paper does not decrease.

Furthermore, according to the embodiments, the color patches at the outermost peripheral of the color block 800 is affected by the reflected light from the basic color of the paper. To reduce this impact, at least one color patch at the outermost peripheral is copied and the copy of the color patch is laid out to the outside of the color patch. Therefore, when the color patch at the outermost peripheral is subjected to measuring by an image pickup device such as a scanner able to read a two dimensional range, the error of the measuring result of the color concentration is small because the copy of the color patch having the same concentration as the color patch is laid out in the vicinity thereof, In addition, according to the embodiments, as illustrated in FIG. 4, the ratio of the color reproduction concentration of the remaining reproduction color in one color chart in which the ratio of the color reproduction concentration of the reproduction colors is changed one degree by one degree with a particular fixed value to, for example, the 12th degree. Those makes a group of color chart having 12 color charts of 900-1 to 900-12 having different color reproduction concentrations of color reproduction.

When the group of the 12 color charts is read by an image pickup device such as a scanner able to read a two dimensional range, the error of the measuring result of the color concentration is small.

What is claimed is:

1. A color chart comprising:
    a plurality of mirror-image color blocks arranged in a matrix, with each color block a mirror image of an adjacent color block,
    each color block comprising rows and columns of color patches, wherein:
        a concentration of a first color of the multiple colors changes unidirectionally across color patches in any given row of a color block;
        a concentration of a second color of the multiple colors changes unidirectionally across color patches in any given column of a color block;
        a concentration of a third color of the multiple colors remains unchanged across all the plurality of color patches within a color block and differs only between color blocks; and
        among adjacent two color blocks, there is no color change between rows of two adjacent color patches, and there is no color change between columns of two adjacent color patches.

2. The color chart according to claim 1, wherein the concentration of the first color of the rows of color patches changes in discrete levels at a fixed rate.

3. The color chart according to claim 1, wherein the concentration of the second color of the columns of color patches changes in discrete levels at a fixed rate.

4. The color chart according to claim 1, wherein the concentration of the third color of differs between adjacent color blocks in discrete levels at a fixed rate.

5. A group of color charts comprising:
    a plurality of the color charts of claim 1,
    wherein a concentration of a fourth color of the multiple colors differs between color charts.

6. The group of color charts according to claim 5, wherein the concentration of the fourth color among the plurality of the color charts changes in discrete levels at a fixed rate.

7. An image forming apparatus that generates a color chart of for use in color reproduction concentration adjustment, comprising:
    a memory unit that saves image data of a first color block; and
    a processor that reverses the first color block to form a second mirror image of the first color block to form the color chart,
    wherein the color chart includes:
    a plurality of mirror-image color blocks arranged in a matrix, with each color block a mirror image of an adjacent color block, each color block comprising rows and columns of color patches, wherein:
    a concentration of a first color of the multiple colors changes unidirectionally across color patches in any given row of a color block:
    a concentration of a second color of the multiple colors changes unidirectionally across color patches in any given column of a color block;
    a concentration of a third color of the multiple colors remains unchanged across all the plurality of color patches within a color block and differs only between color blocks; and
    among adjacent two color blocks, there is no color change between rows of two adjacent color patches, and there is no color change between columns of two adjacent color patches.

* * * * *